W. F. AIDLOTTE.
SICKLE BAR.
APPLICATION FILED JULY 7, 1919.
1,340,868.
Patented May 25, 1920.
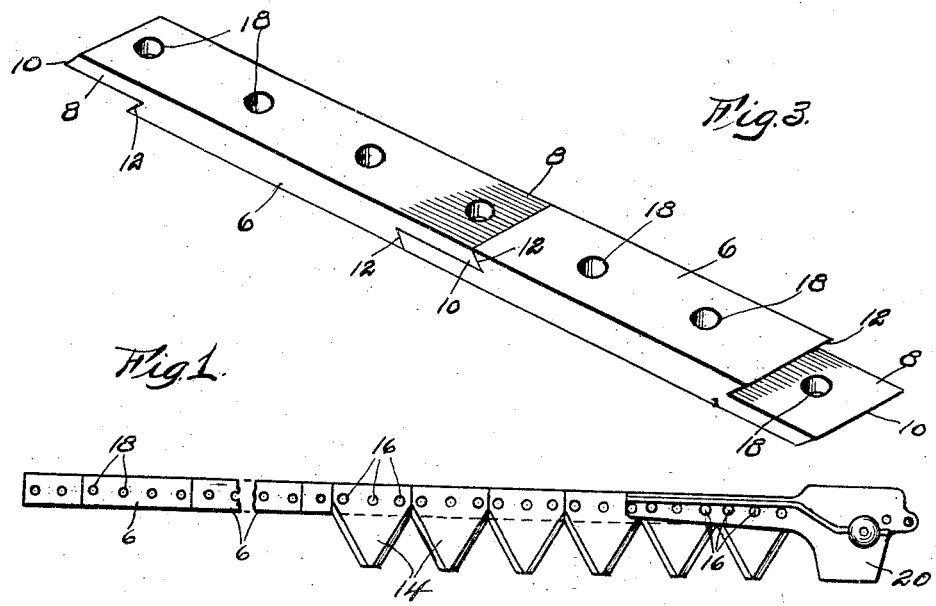
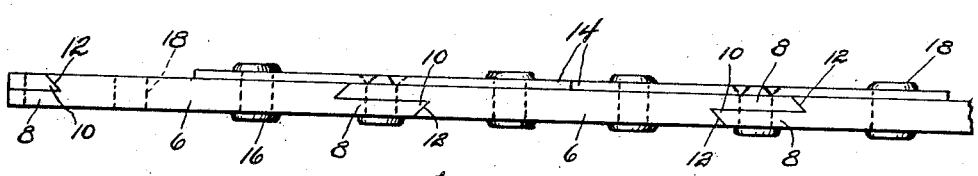
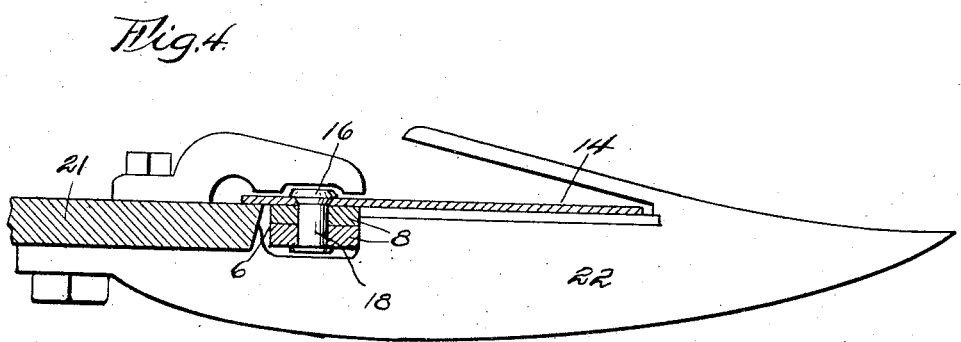
INVENTOR
W. F. Aidlotte,
BY
His ATTORNEY.

UNITED STATES PATENT OFFICE.

WILLIAM F. AIDLOTTE, OF HIATTVILLE, KANSAS.

SICKLE-BAR.

1,340,868.         Specification of Letters Patent.         Patented May 25, 1920.

Application filed July 7, 1919. Serial No. 309,062.

*To all whom it may concern:*

Be it known that I, WILLIAM F. AIDLOTTE, a citizen of the United States, residing at Hiattville, in the county of Bourbon, State of Kansas, have invented a certain new and useful Improvement in Sickle-Bars, of which the following is a complete specification.

The present invention relates to improvements in mowing machines and aims to provide an improved sickle bar construction for this type of machine. Accordingly one of the objects of the invention in to devise an improved form of sectional sickle bar for the purpose of enabling repairs to be made more quickly and economically as compared with the expense and time required for repairing a bar made in the usual continuous form.

For accomplishing this result I provide an improved sectional form of sickle bar so constructed and arranged as to permit the ready removal and replacement of such parts as may become worn, broken or otherwise defective. It is also sought to provide a sectional sickle bar of such a construction as will be practically as strong and rigid as the usual continuous or integral form of such bars.

With this general object in view, the invention will now be described with reference to the accompanying drawing illustrating one practical form of construction which has been devised for embodying the proposed improvement, after which the novel features thereof will be particularly defined in the appended claims.

In the drawing—

Figure 1 is a plan view, partly broken away, illustrating a sectional sickle bar constructed in according with the present invention;

Fig. 2 is an edge view of a portion of the sickle bar, on a larger scale;

Fig. 3 is a perspective view of two of the sickle bar sections; and

Fig. 4 is a transverse sectional view (on an enlarged scale) showing the sickle bar mounted in its proper relation to the usual finger bar, the section being taken through the overlapped or joint portions of a pair of adjoining sections of the sickle bar.

Referring to said drawing in detail, the improved construction is shown as comprising a series of sickle bar sections 6, each comprising a body portion of usual thickness and also reduced end portions 8, each end portion having a beveled terminal edge 10, and the body portion having undercut shoulders 12 overhanging the inner end of each of the end portions 8. The construction is such that when the several sections 6 are arranged end to end in alinement, with every other section reversed in position, the adjoining end portions 8 of each pair of adjacent sections 6 will overlap, the beveled terminal edge 10 of each of said sections being embraced within the undercut shoulder 12 of the other adjoining section, and so on throughout the length of the sickle bar. A sufficient number of the sections are thus arranged in overlapping and alined relation to accommodate the desired number of sickle blades or knives 14, which blades are also arranged in alinement and abutting in the usual manner, but with each blade 14 overlapping a pair of the adjoining bar sections 6. In this assembled relation the blades are utilized to form joints with the corresponding bar sections 6, and suitable fastening means, such as rivets 16, are employed for securing the parts together in this relation, for which purpose the bar sections are provided with rivet openings 18 adapted to register with similar openings in the knife blades 14. Two of the rivet openings of each section 6 are formed through the end portions 8 and so located that the overlapping end portions of any two adjoining sections 6 will bring their rivet openings 18 into register.

At the head of the sickle bar the rivets 16 may also be conveniently used for fastening the head member 20, to which the usual pitman connection is applied for actuating the sickle bar and knives in the cutting operation. In Fig. 4 the sickle bar is illustrated in its operative position in relation to a finger bar 21 carrying the usual finger guards 22.

With the above construction, the sections 6 of the sickle bar are all made as exact duplicates, and in the event of one of the parts of the structure becoming worn, broken, or otherwise defective, it is only necessary to remove the part which requires to be repaired or renewed, which is done by simply cutting the corresponding rivets 16 and taking out the part requiring attention. These rivets can readily be sheared by means of a few sharp blows with a hammer on the head of the blade corresponding to the rivets to be severed. The necessary repairs or renewals can then be quickly attended to and the parts at once riveted back into place as before, thus eliminating the loss of time incurred in welding the continuous or integral form of cutter bar or the taking of the same to a shop to have the work done.

The present construction is also an improvement over other forms of sectional bars in that the improved form of joint provides a strong and rigid connection between the sections, since the overlapping portions 8, having the beveled ends 10 embraced by the undercut shoulders 12, affords a simple and efficient structure in which the parts comprising the joints are held against tendency to yield in any transverse direction, in all practical respects the same as an integral or continuous bar.

Having described the invention, what I claim is:

1. A sectional sickle bar construction comprising a series of bar sections arranged in alinement, each of said sections having reduced end portions with beveled terminals and undercut shoulders at the inner ends of said end portions, each pair of adjoining sections having their end portions arranged in overlapping relation with the beveled terminal of each adjoining section embraced by the undercut shoulder of the other adjoining section.

2. In a sectional sickle bar, the combination of a series of alined bar sections, each of said sections having reduced end portions with beveled terminals and undercut shoulders at the inner ends of said end portions, each pair adjoining sections having their end portions arranged in overlapping relation with the beveled terminal of each adjoining section embraced by the undercut shoulder of the other adjoining section, and a series of knife blades riveted to said bar sections with said blades in abutting relation and each blade overlapping a pair of said bar sections.

In witness whereof I hereto affix my signature.

WILLIAM F. AIDLOTTE.